(12) United States Patent
Skogsrud et al.

(10) Patent No.: US 10,488,842 B2
(45) Date of Patent: Nov. 26, 2019

(54) DEVICE AND METHOD OF MOTION CONTROL

(71) Applicant: Polarworks AS, Oslo (NO)

(72) Inventors: Simen Skogsrud, Oslo (NO); Thomas Boe-Wiegaard, Easton, CT (US)

(73) Assignee: Polarworks AS, Oslo (NO)

( * ) Notice: Subject to any disclaimer, the term of this patent is extended or adjusted under 35 U.S.C. 154(b) by 0 days.

(21) Appl. No.: 16/091,265

(22) PCT Filed: Apr. 26, 2017

(86) PCT No.: PCT/US2017/029715
§ 371 (c)(1),
(2) Date: Oct. 4, 2018

(87) PCT Pub. No.: WO2017/189774
PCT Pub. Date: Nov. 2, 2017

(65) Prior Publication Data
US 2019/0129373 A1    May 2, 2019

Related U.S. Application Data

(60) Provisional application No. 62/328,547, filed on Apr. 27, 2016.

(51) Int. Cl.
*G05B 11/42*     (2006.01)
*G05B 19/35*     (2006.01)
(Continued)

(52) U.S. Cl.
CPC ............ *G05B 19/358* (2013.01); *G05B 11/42* (2013.01); *G05B 19/351* (2013.01);
(Continued)

(58) Field of Classification Search
CPC .... G05B 11/42; G05B 19/358; G05B 19/416; G05B 2219/41206; G05B 2219/41213; G05B 2219/41326; G05B 2219/42064
(Continued)

(56) References Cited

U.S. PATENT DOCUMENTS 6,363,310 B1 * 3/2002 Schuplin ................ B60K 31/04
123/319
2007/0296364 A1   12/2007 Shoemaker
(Continued)

*Primary Examiner* — Michael J Brown
(74) *Attorney, Agent, or Firm* — Kim Rubin, Patent Agent

(57) ABSTRACT

A device and method of iterative motion control is described using a non-linear table in a feedback loop to convert a desired acceleration input to motor drive outputs, where the motor is part of a controlled motion system. The table may be a two- or three-dimensional table additionally responsive to the current system state, such as shaft speed, position, or phase angle. The motor may be a two-coil stepper motor where the corrected non-linearity serves the purpose of maintaining desired toque. Inputs may be waypoints comprising both a target position and target velocity. The motion system may use an inverted SCARA arm. Up to three non-linear correction tables may be used: a first corrects motor steps to a more accurate shaft angle; a second corrects motor drive signals to achieve desired torque; a third correct motor drive signals responsive to shaft speed. Tables may be generated by a series of motion passes using a fixed shaft offset angle for each pass.

12 Claims, 8 Drawing Sheets

(51) Int. Cl.
*G05B 19/404* (2006.01)
*G05B 19/41* (2006.01)

(52) U.S. Cl.
CPC .. *G05B 19/404* (2013.01); *G05B 2219/41206* (2013.01); *G05B 2219/41213* (2013.01); *G05B 2219/41326* (2013.01); *G05B 2219/42064* (2013.01)

(58) Field of Classification Search
USPC .................................................. 700/264, 275
See application file for complete search history.

(56) References Cited

U.S. PATENT DOCUMENTS

| | | |
|---|---|---|
| 2012/0283844 A1 | 11/2012 | Langlois |
| 2013/0135369 A1 | 5/2013 | Price |
| 2014/0244083 A1* | 8/2014 | Kim ..................... B60W 20/00 701/22 |
| 2015/0127242 A1* | 5/2015 | Iizuka .................... F16H 61/02 701/110 |

* cited by examiner

PRIOR ART

DEVICE AND METHOD OF MOTION CONTROL

This application claims priority to U.S. Provisional application 62/328,547, filing date 27 Apr. 2016; prior art includes, U.S. Pat. No. 5,770,829A, "Katz"; U.S. Pat. No. 9,041,337B2, "Tian"; US20130197688A "Egi"; and U.S. Pat. No. 4,769,583A, "Goor".

BACKGROUND OF THE INVENTION

The field of this invention is closed-loop controllers, particularly for control loops to maintain, at least part of the time, a desired acceleration for a motor or other actuator.

Prior art motion controller typically monitor a position and respond with changes in a drive signal to maintain a desired position, which may be relatively static or dynamic. Other prior art controllers monitor a velocity and respond with changes to a drive signal to maintain a desired velocity, typically static, although sometimes dynamic.

A common feedback method is PID, or proportional-integration-differential, in which an error signal, and integrated error signal and a differentiated control signal are each is multiplied by three respective values and then summed to provide an updated drive signal.

Such prior art methods and devices, whether continuous, such as an analog system or discreet, such as a digital system, suffer from numerous weaknesses including: poor response to varying desired position or velocity; instability, poor response to varying loop gain; poor response in non-linear systems, poor response in non-symmetric systems, and an inability to adapt constants used in PID terms to actual or dynamically changing system characteristics.

Prior art systems for stepper motors are typically open loop, using the steps of the stepper motor to achieve a desired position, include micro-step and sinusoidal drive. Such systems suffer from noise, vibration, and non-linear motion. Such prior art systems are also unresponsive to non-linear motor performance between steps and changing system characteristics, such as varying or oscillating loads.

BRIEF DESCRIPTION OF THE INVENTION

Embodiments of the current invention overcome the above-described and other weaknesses of the prior art.

Embodiments include an iterative, closed-loop, real-time, mechanical control system comprising a linearization module. The linearization module accepts as input a desired acceleration. Its outputs drive a motor so as to achieve the desired acceleration of the motor shaft. Embodiments include only certain elements of the complete system, such as only the linearization module.

Embodiments of the linearization module include, in various combinations, three non-linear tables. A first table corrects, or linearizes, angular position of a stepper motor as an output with an input of the step number of the motor. A second table corrects, or linearizes, motor torque of a stepper motor as one or more output phase angles with an input of desired acceleration, for motor positions between full or quarter steps, that is: intra-step position. A third table linearizes motor torque as an output with an input of motor shaft velocity.

Functions may be used in place of tables. Tables may be combined. One table may be used to select one or more other tables.

The outputs of the linearization module may drive a motor directly, or more typically go through one or more motor drivers, such as amplifiers, voltage-to-current converters, pulse-width-modulators, transmitters, and the like.

The motor is part of a controlled mechanical system. The complete system includes a module that provides iterative real-time process control, which accepts as one input a position, such as a motor shaft position and outputs a desired motor acceleration, or torque. This desired acceleration goes to the linearization module, which then drives the motor in the system. Thus, there is closed-loop control with the linearization module, the motor, and the iterative real-time process control in the loop. The iterative real-time process control also accepts a goal stream, such as a sequence of waypoints. Each waypoint may comprise both a target position and target velocity of the motor. Typically, for one target waypoint, multiple iterations are used to achieve the target waypoint.

Typically the up to three tables in the linearization module are static tables in the sense that they do not change for a goal stream. In some embodiments the system is characterized, or calibrated, prior to use. This calibration generates the one or more of the non-linear tables, which are then applied to the linearization module for operation.

The linearization module provides higher accuracy, better performance, and higher-speed operation than prior art. It may also provide a system with less noise, less vibration, better loop stability, and lower maintenance than prior art.

Motors may be any type of mechanical actuator.

Applications and embodiments include a wide range of mechanical system and also non-mechanical systems that may be modeled as an analog to a mechanical system is that they have a parameter that corresponds with position, and first and second derivatives of that parameter that correspond with velocity and acceleration, respectively. Embodiments may have more than one axis.

The application claims priority to US provisional applications U.S. 62/328,544 and U.S. 62/328,547.

DETAILED DESCRIPTION OF THE INVENTION

Descriptions, scenarios, embodiments, and Figures are exemplary and non-limiting.

We begin our discussion with terminology: "acceleration" includes both linear acceleration and torque, unless otherwise clear from the context. "Velocity" includes both linear speed and rotational speed, unless otherwise clear from the context. "Force," includes both linear force and rotational force. "Position" includes a position in any coordinate system, including both scalars and vectors, unless otherwise clear from the context. Coordinate systems may be Cartesian, polar, SCARA (Selective Compliance Articulated Robot Arm), hybrids, or complex non-linear systems. Position is often, but not limited to, a motor shaft angle. "Motor" includes any type of mechanical actuator, unless otherwise clear from the context. "Table" includes functions with defined inputs and outputs, otherwise clear from the context. A table may be a function. "Jerk" is the derivative of acceleration. Acceleration may be computed from jerk by integrating jerk over a time period, such as one iteration time interval. Breadth of claims and embodiments includes both linear and rotational systems, independent of terms used.

Figure 1:
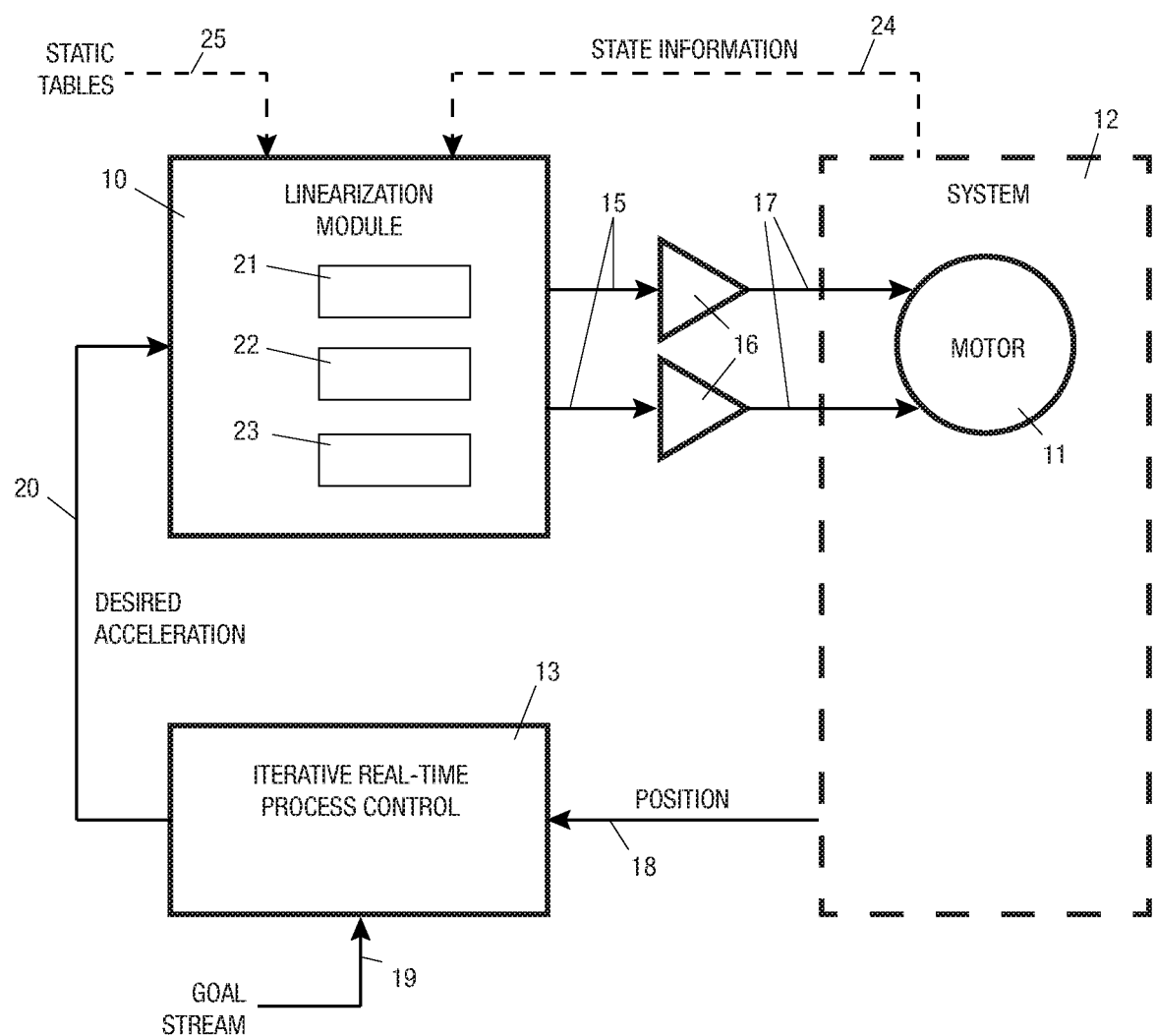
FIG. 1 shows an embodiment of a closed-loop system with a linearization module.
Figure 2:
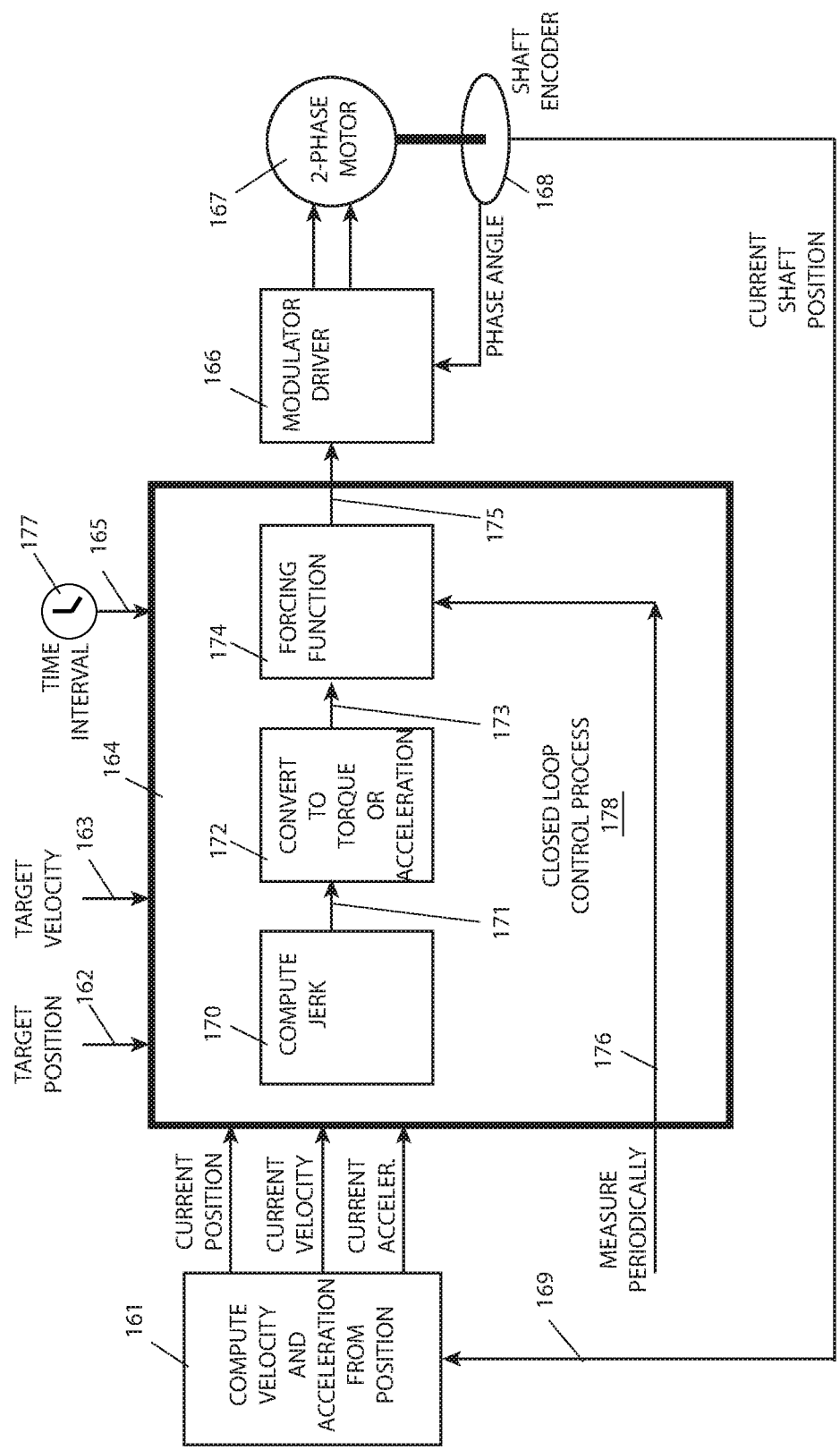
FIG. 2 shows another embodiment of a closed-loop system with non-linear forcing function.

Turning now to FIG. 1 we see a closed-loop, real-time iterative control system comprising a linearization module. Embodiments include complete systems as well as specific combinations of modules, such as just the linearization module. It is convenient to start discussing a complete closed-loop system. The mechanical system or device, such as a machine tool, is shown as 12, comprising a motor 11. At least one output of the system, such as a motor shaft position, is sent back to an iterative, real-time process control module 13. This module typically executes some computation. This module is discussed in more detail below. Embodiments include a linearization module 10 in the closed loop. Module 10 provides one or more outputs that directly or indirectly control the motor 11. Embodiments include iterative, real-time process control modules 13 that output only acceleration 20, or are free of position outputs and free of velocity outputs.

The purpose of the linearization module 10 is to drive the motor to achieve exactly the instantaneous real-time, desired acceleration 20. In the exemplary scenario of this Figure, acceleration is motor torque. Module 10 has any combination of three non-linear tables, 21, 22 and 23. These are described in detail below. In the Figure is shown an exemplary two-phase motor, 11, such as a stepper motor, driven either directly from module 10 or via intervening drivers, such as amplifiers or modulators 16. Many other motor types may be used, including one, two, three, four and more phase motors. Motors include AC motors, DC motors, servo motors, permanent magnet motors, linear motors, synchronous motors including 3-phase AC motors, induction motors. Other mechanical actuators, which we include in the term, "motors." include piezoelectric transducers (PZT), pumps, rail guns, voice coils and other electromagnetic coils. Non-mechanical systems that behave as analogs to mechanical systems are discussed below. In the scenario in the Figure the linearization module 10 provides two outputs 15 which are phases for the two-phase motor 11. Amplifiers, modulators or other intermediate electronics are shown as 16. For example, these may be pulse-width modulators (PWM). Signals 17 connect directly to the motor windings. Elements 16 may be internal to the linearization module 10, or inside the system 12, or part of the motor 11.

Position feedback from the system is shown 18. This may be a motor shaft angle. However, many other possible signals may be fed back to the iterative real-time process control module 13, including velocity, acceleration, other position sensors, or other measured parameters.

The iterative, real-time process control module 13 has to know what the goal of the operating system is. Typically, it accepts a series or stream of waypoints, 19. In some embodiments, each waypoint includes both a target position and target velocity. Typically, multiple iterations of the closed-loop system will be used to achieve each target waypoint.

In some embodiments, system state data 24 is fed back from the system 12 to the linearization module 10. Such state information may be stored or determined internally in the linearization module 10. State information 24 is optional. Some embodiments of the linearization module 10 do not require any system state information. Such state information may include a step number of a stepper motor, phase angle for a multi-phase motor, velocity of the motor, system load, a motor shaft angle, and other mechanical state information. The linearization module 10 may be able to determine or remember any portion of this system state data without an explicit input 24.

The linearization module 10 has some combination of three non-linear tables 21, 22, and 23. Such non-linear tables are a key and novel embodiment. These tables may be computed or determined prior to system operation and loaded 25 into the linearization module prior to system operation. We call these static tables because they do not change over the course of a goal stream 19. In some embodiments the tables are built-in to the linearization module 10 and so table installation 25 is optional.

A first table 21 corrects, or linearizes, position of a stepper motor shaft using a step number as an input. For example, a stepper 11 might have 400 steps, which we arbitrarily number 1 to 400 for convenience. In a perfect motor, each step would be precisely $1/400$ revolution, or $360°/400$ or 2-pi-radians/400. However, motors are not perfect. A first table may look up the 400 steps, or 1600 quarter-steps, and output a more accurate shaft position. The number of entries in the table varies. In some embodiments, fewer table entries are used than the number of steps. In some embodiments, more table entries are needed than the number of quarter steps. Such a table may be uniquely determined for each individual motor used. Such a table may also correct for eccentricities, or other errors in a shaft angle sensor. Although there are many ways to measure motor shaft position, one method and embodiments use one or more hall-effect sensors connected directly or indirectly to the motor shaft. Another embodiment uses a magnet on the motor shaft and one or more hall-effect sensors proximal to the magnet. In some embodiments, the hall-effect sensor(s) may have to be calibrated before the motor, or at the same time as the motor. Some embodiments compensate for either shaft or shaft sensor wobble. An embodiment uses a Kalman Filter for this correction. A Kalman Filter may also be used smooth and predict velocity and acceleration, as well as position.

Accurate motor shaft position is required to generate accurate signals to the motor to create a desired acceleration. For example, if a first step is 1.0° and a second step is 1.2°, the phase angles for the second step will have a lower rate of change for the same true shaft angular velocity. Similarly, the rate of change of the rate of change will have to be lower for an accurate desired acceleration.

A position correction table 21, in some embodiments, may reside inside of system 12, and thus corrected position may be included in state information 24 or real-time position 18, rather than having the table 21 inside of a linearization module 21. In either location, table 21 serves the same purpose and is in the same positional arrangement and step order.

Figure 4:
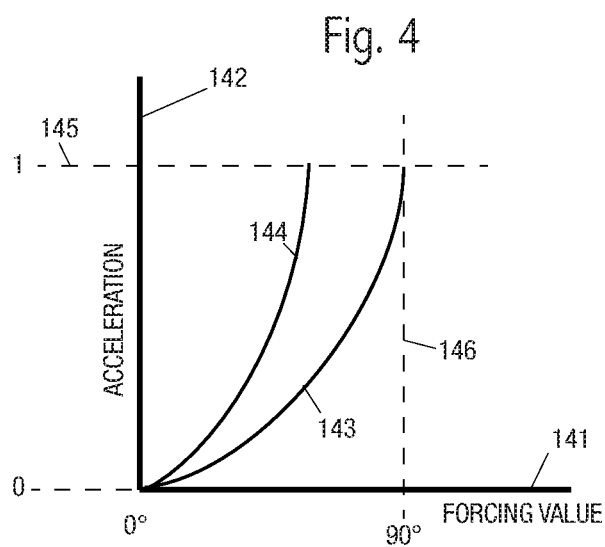
FIG. 4 shows two non-linear forcing functions.
Figure 5:
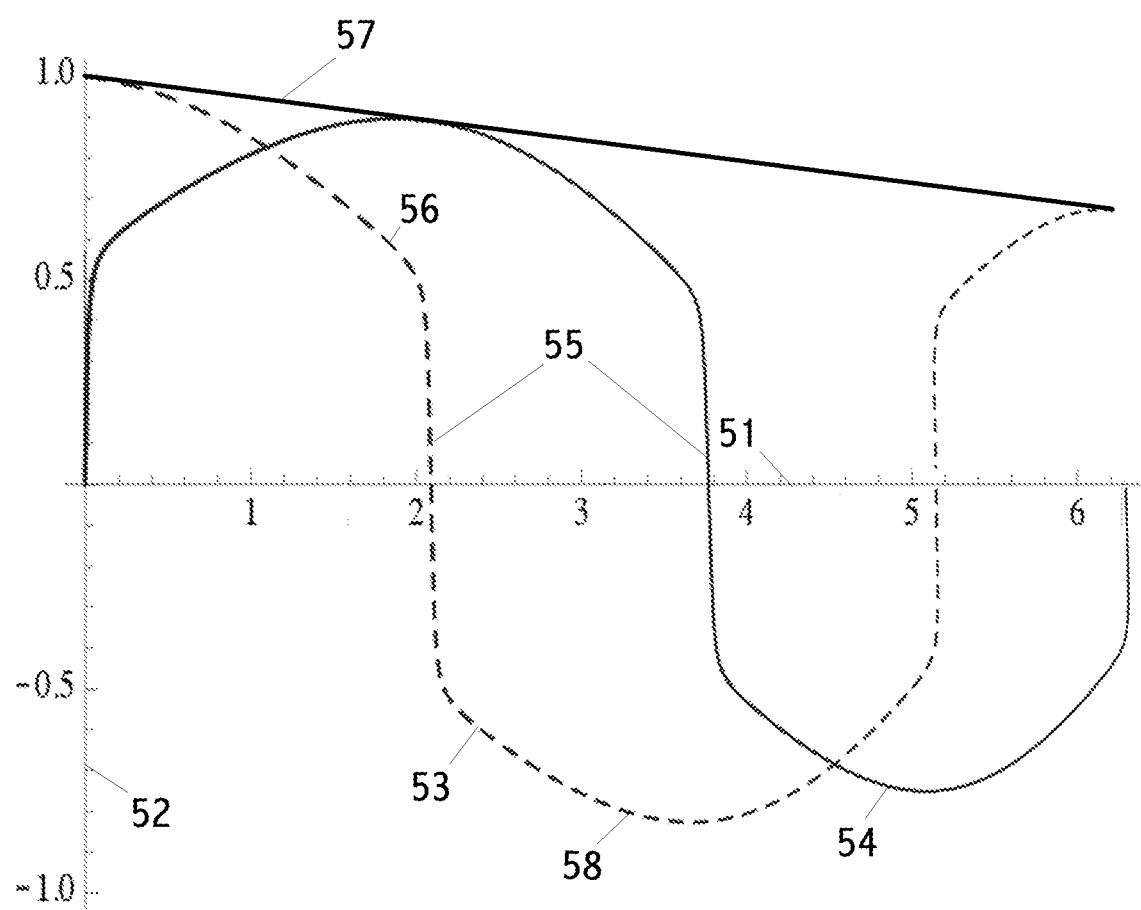
FIG. 5 shows two non-linear phase outputs.
Figure 6:
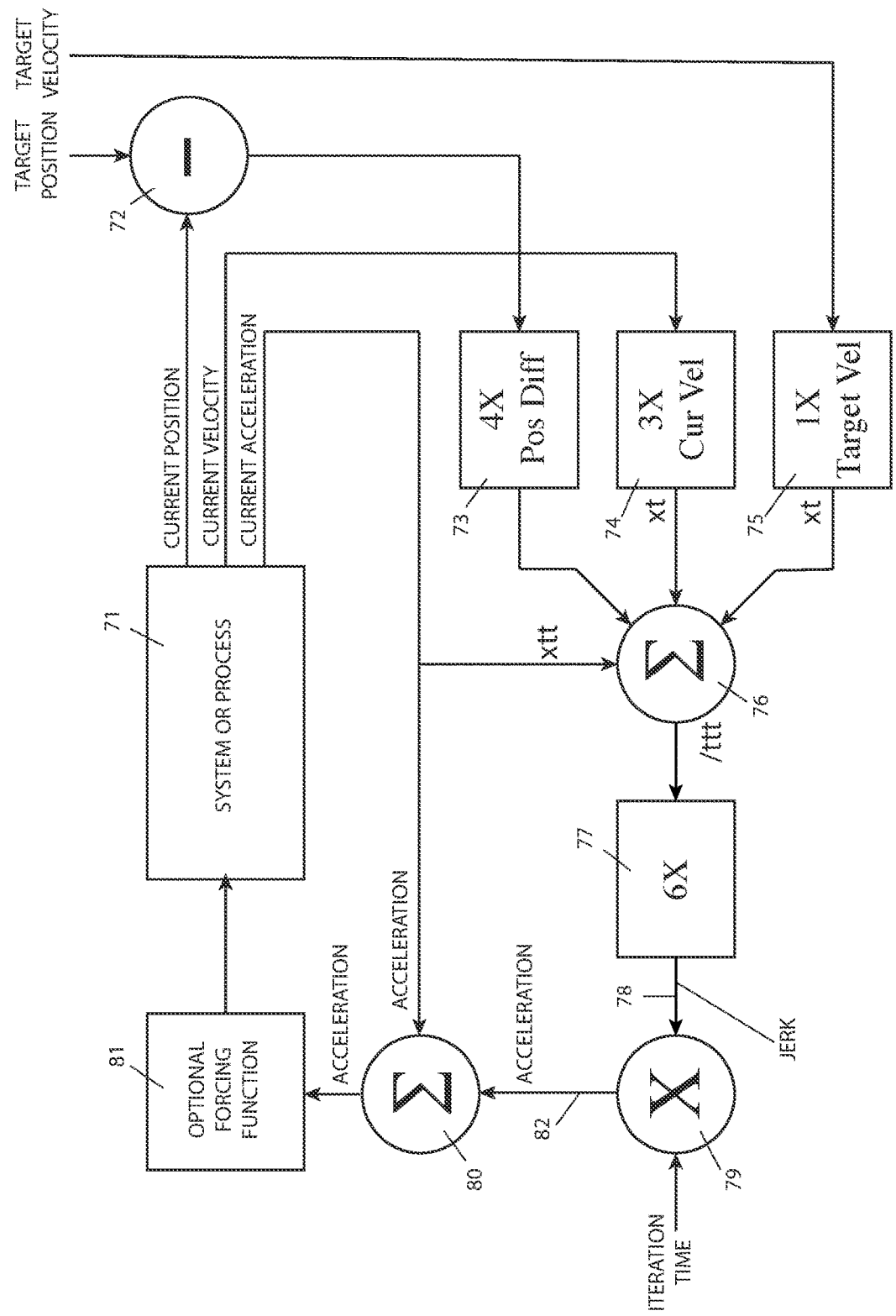
FIG. 6 shows a block diagram of a process control method.
Figure 7:
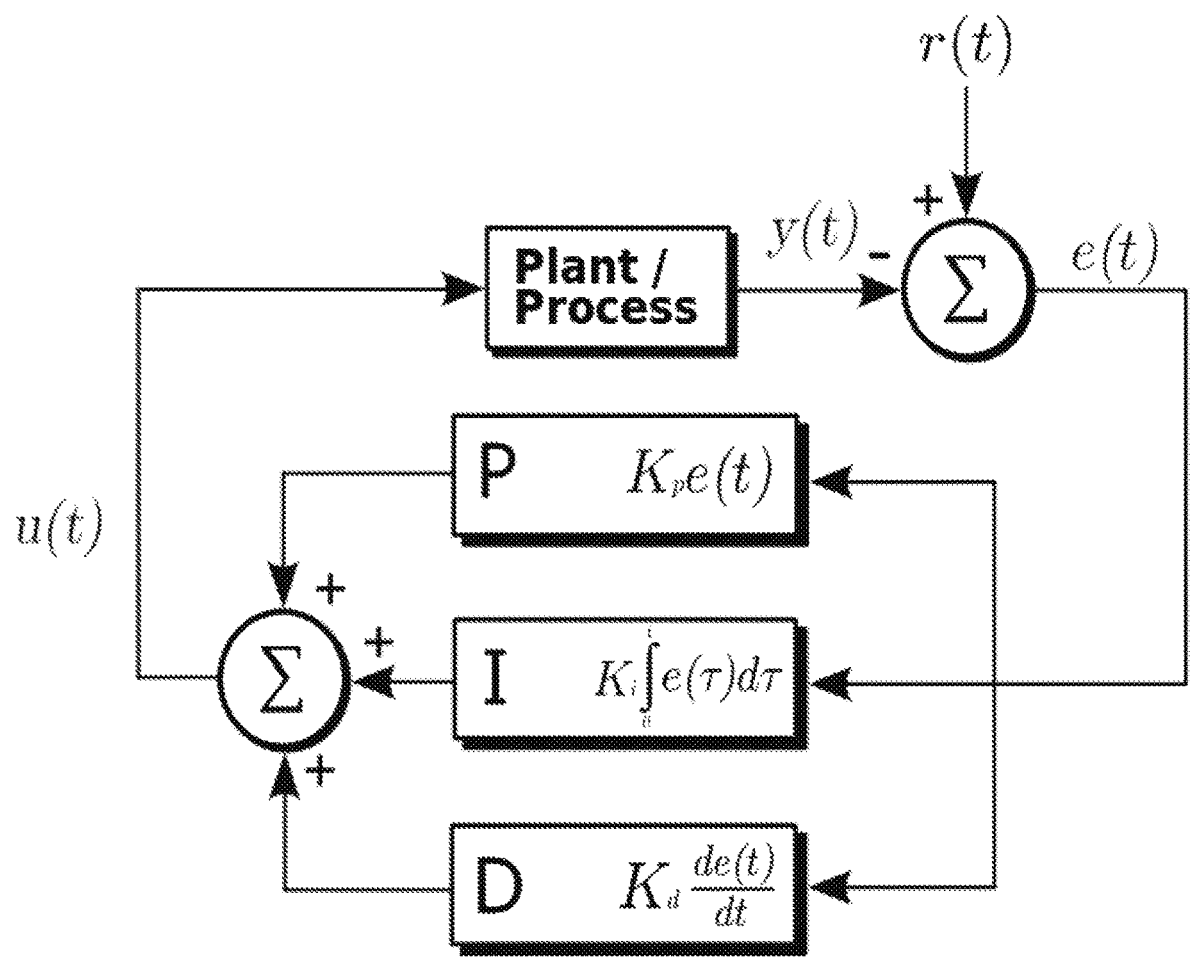
FIG. 7 shows prior art

A second table 22 corrects, or linearizes, motor torque as a function of intra step angle. In a perfect motor, not only would the phase angle between steps be perfectly linear with position but a differential phase angle between a current shaft position and a driven phase signal would produce a constant torque for a constant difference. See also FIGS. 3A and 3B. However, actual motor torque is not constant for such differential phase angles. Thus, a second, non-linear table 22 linearizes motor drive for desired torque within one motor step, including within a motor quarter-step. The inputs to the table are current intra-step phase angle of the motor and desired acceleration. The output(s) of the table 15 are either a phase difference or actual phase angles to drive the motor. Such an exemplary table is shown as two curves in FIG. 4. Such a table may be determined by measuring torque for a range of intra-phase angles and phase differences. For some embodiments, for some motors, the shape of the curve or table entries will be consistent for all intra-steps. For other embodiments or other motors, the table or shape of the function will vary with different step numbers. For some embodiments and motors, this table will be consistent for all motors of a single model from a single manufacturer. For other embodiments and motors, a unique table will be required for each individual motor. An interesting embodiment is the use of intra-step position as a proxy for torque. Intra-step position, for a stopped stepper motor, in effect measures the relative field strength of the two coils at that position. Since it is field strength that determines torque, this position information may be used to construct the table 22 without having to measure torque directly at such fine shaft position resolution. Note that since there are two phases, this information, and in some embodiments, the resulting table, is two dimensional. That is, the differential phase angles of the two phases do not necessarily have to be exactly 90° apart. See also FIG. 5. Different differential phase angles may be tested to find differential phase angles that produce a linear position for a stopped motor. These differential phase angles may then be used to populate the second table 22.

A third table 23 corrects, or linearizes, motor torque as a function of motor velocity. Such a table may be created by putting a known load on the motor, such as a rigid rotational mass. This mass is then driven over a range of motor velocities, and then actual acceleration is measured for both different drive strength and motor velocities. Ideally, both the first and second tables 21 and 22 are already in place for these measurements. Note that positive and negative acceleration may behave differently. That is, the system may not be symmetric. This is important because classic PID controllers do not handle such asymmetric systems well. Embodiments with table 23 improve the performance of systems with PID as well as other iterative real-time process control methods.

FIGS. 8-11 show exemplary correction or linearization tables or curves.

Figure 3A:
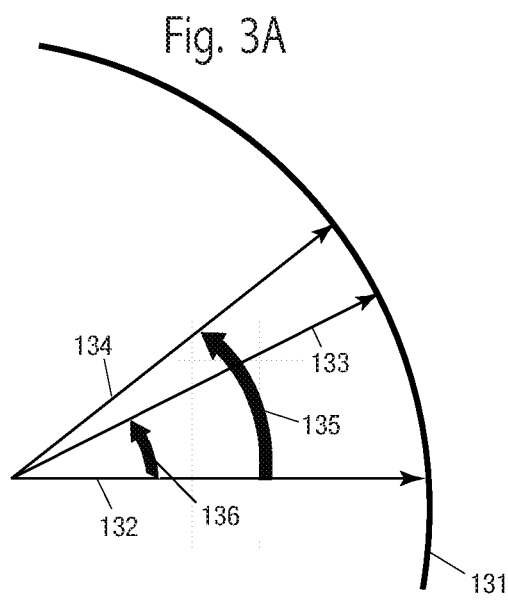
FIG. 3A shows adjustment to a motor phase angle to achieve desired torque.
Figure 3B:
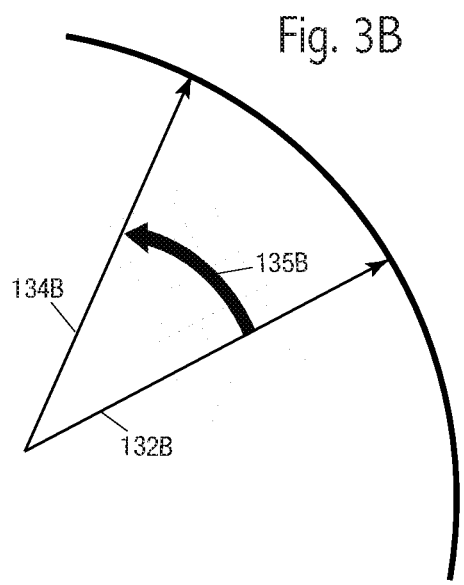
FIG. 3B shows a second motor phase angle.

With an input of desired acceleration, a stepper or other multiphase motor is driven by providing an offset phase angle from the current phase angle of the shaft, for each motor coil. FIGS. 3A and 3B show examples for a single position of a single coil. The challenge is determining what offset phase angle will achieve the desired acceleration.

Figure 8:
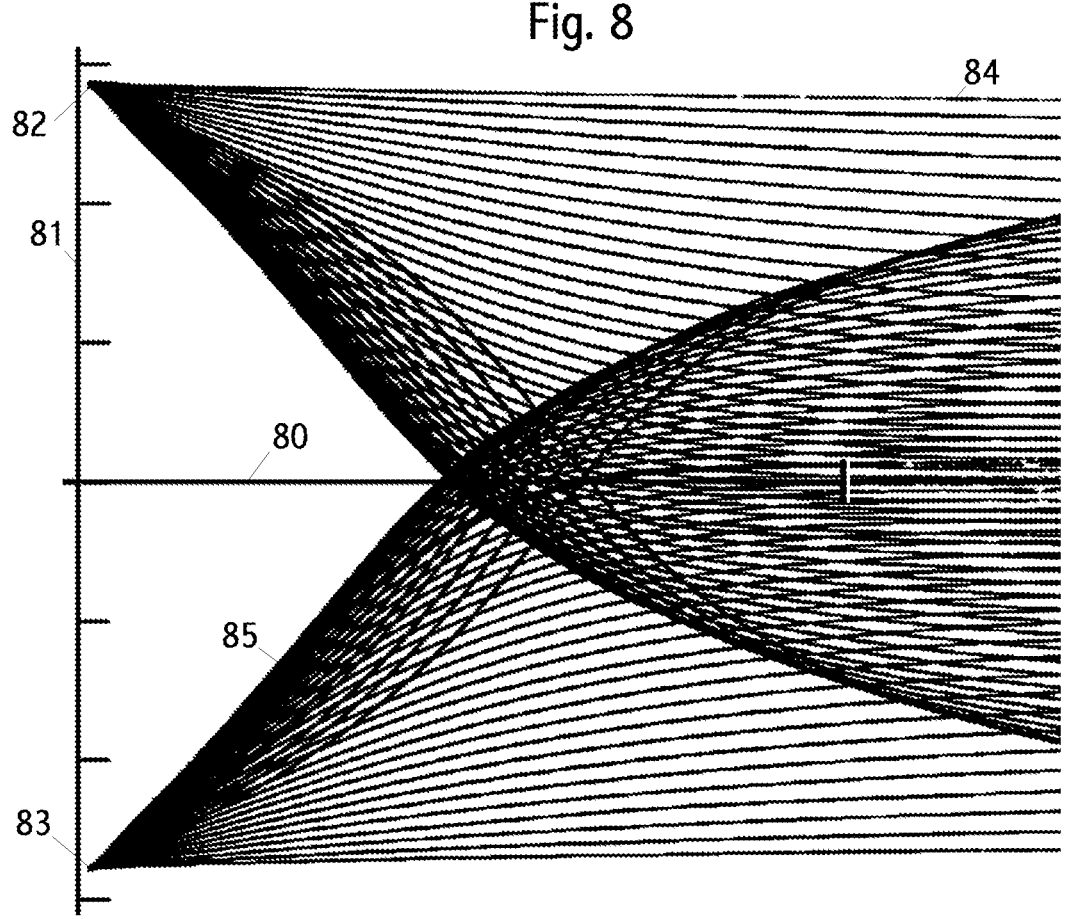
FIG. 8 shows an exemplary set of curves showing offset phase angle v. velocity and acceleration.

FIG. 8 shows a set of curves identifying offset phase angles as a function of velocity. The horizontal axis 80 is time and the vertical axis 81 is velocity. Each individual line, such as curve 84, represents a different offset phase angle. The slope of a line at a given point on the line is acceleration. The set of curves is created by starting the motor at a known high velocity, upper left 82. A fixed negative phase offset to decelerate the motor is applied, which then generates each curved line shown. For a particular curve, moving left to right on the horizontal axes shows the motor slowing down and then sometimes reversing. This process is repeated starting at a negative velocity, lower left 83, and applying a fixed positive phase offset, producing the curved lines that rise toward the right. To use this set of curves to implement a desired acceleration at a known velocity, the velocity is a horizontal line extended from the vertical axis. The curve that it intersects that has the desired acceleration (slope) identifies the necessary phase offset angle: it is the one that generated that particular curve. Curve 84 is a phase angle offset that maintains an initial high velocity while slowing slightly. Curve 85 is a phase angle offset that produces the largest acceleration.

Note that all curves are generated from discreet points. Thus, the curves are representations of tables, although these tables are large. Smaller tables may be readily generated by smoothing, averaging, interpolating and decimating.

Figure 9:
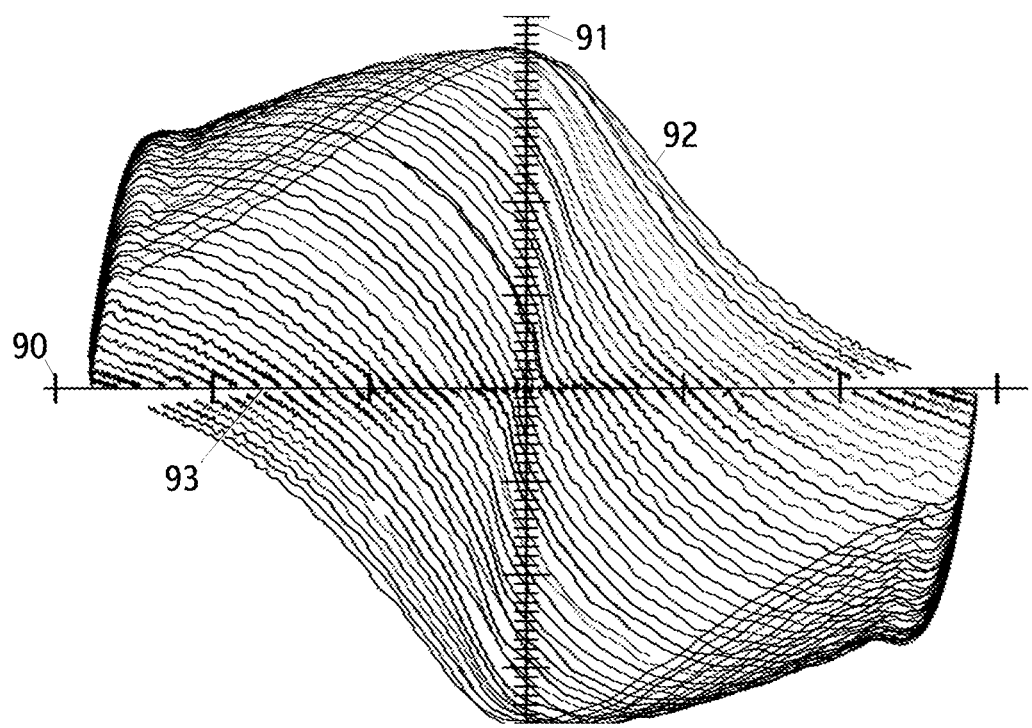
FIG. 9 shows another view of an exemplary set of curves showing offset phase angle v. velocity and acceleration.

In FIG. 9 the data shown in FIG. 8 is replotted as acceleration v. velocity. The horizontal axis 90 is velocity, with each tick in this exemplary set of curves showing increments of 30 radians per second. The vertical axis is accelerations. The span of the vertical axis is approximately −400 to +400 radians per second squared. To use this set of curves, the intersection of the current velocity and the desired acceleration identifies the curve that is the necessary phase angle offset, that is, the output of this particular table. The curves in FIGS. 8 and 9 cover phase offset angles from +pi/2 to −pi/2 radians, which is the maximum possible range of phase offset angles for a stepper motor. These phase offset angles are typically normalized to the range of −1 to +1, which then covers the entire possible range of phase offset angles. Thus, areas within the set of curves represent the complete operating region of a motor, for a particular configuration or embodiment. Note that for the examples shown, it can be difficult to get low-noise data at high velocities.

Figure 10:
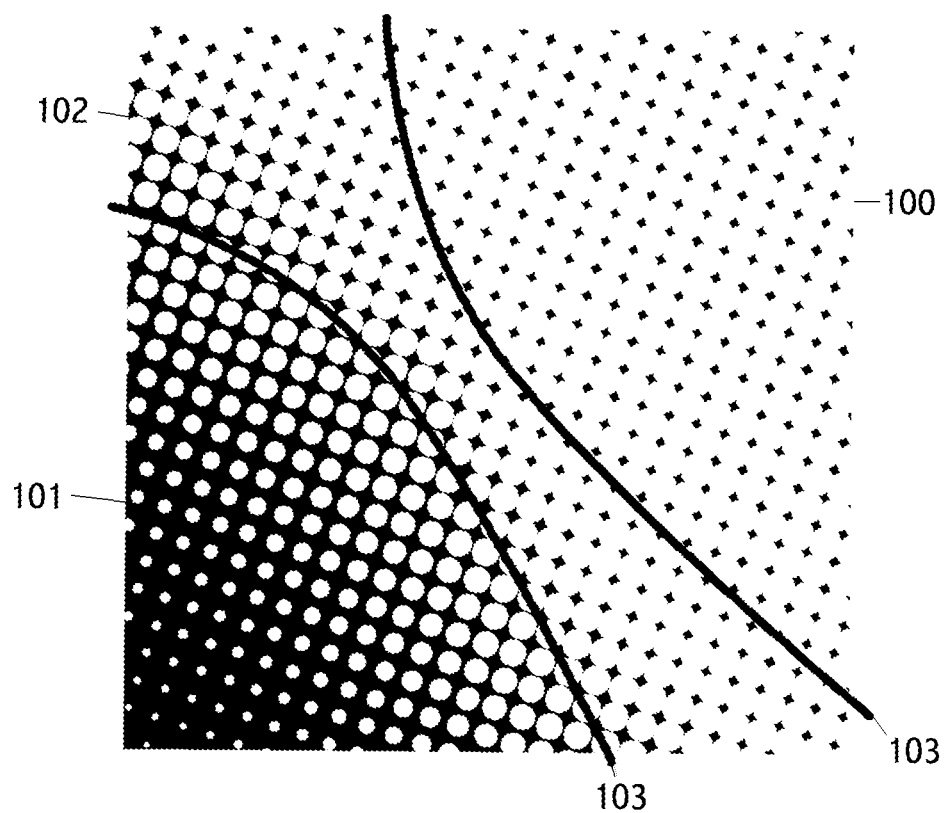
FIG. 10 shows a view of an exemplary non-linear correction table.

FIG. 10 shows an embodiment of data from FIGS. 8 and 9 reduced to a more manageable table size. Due to the obsolete and limited ability of patent drawings to show color and gray scale, this Figure is necessarily a crude representation. An exemplary two-dimensional table may be 256× 256, with 8-bit values in the table. This table represents similar data as in FIG. 9, with velocity on the horizontal axis and acceleration on the vertical axis. Here, the necessary phase offset angle is the level of "gray" in the Figure. The upper right area 100 of the Figure comprises phase offset angles nearer to +1, while the lower left area 101 comprises phase offset angles nearer to −1. The central region 102, identified very approximately as the area between the two curved black lines 103, represents phase offset angles nearer 0.

Figure 11:
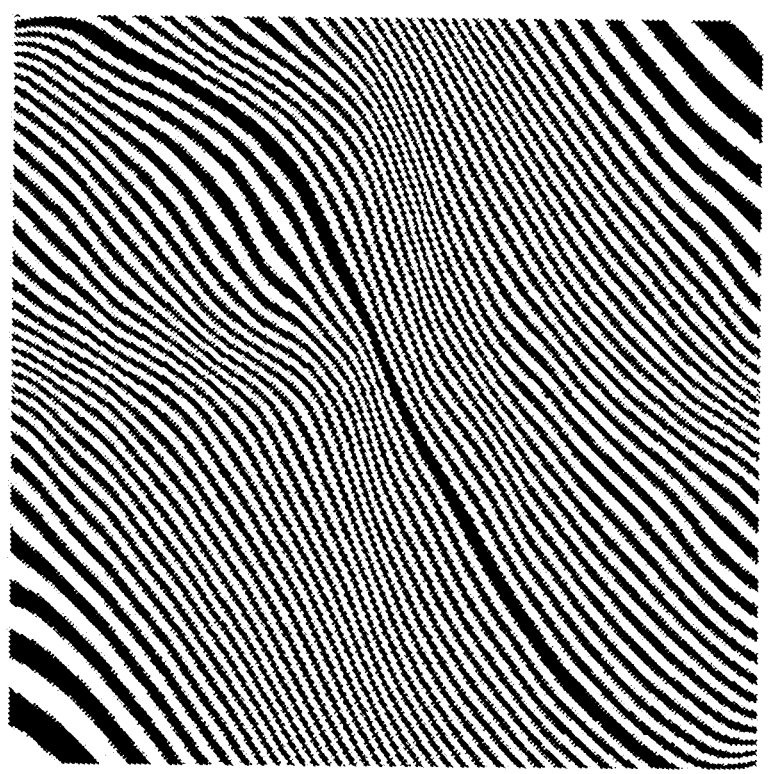
FIG. 11 shows another view of the data in FIG. 10.

FIG. 11 shows a clearer view of the shape of the table in FIG. 10. Here each black line is approximately a difference in table value (phase offset angle) of 4, for 256 different phases offset angles. This Figure allows one to see the significant non-linearities in a real-world system and appreciate the value of embodiments using non-linear correction or linearization elements or steps in a closed-loop control system. Although these exemplary curves sets in FIGS. 8-11 show results of stepping motor, similarly non-linear curves exist for most motors, due to the inherent poles and discreet coils and discreet magnets in motors. Note also the asymmetry between positive and negative accelerations.

Velocity of a motor shaft may be determined by subtracting recent positions and dividing by a time interval. Such velocity values may be improved by filtering, such as averaging, smoothing, predicting, and the like. However, in any case the position data must be accurate. Small errors in position may result in relatively large errors in computed velocity from such positions. Therefore, it is desirable to have a position correction table. Typically, such a correction table element or method step sits between a position sensor input and the computation or use of a velocity computed from such position.

Embodiments are specifically claimed for any combination of motor or system calibration or characterization as described in FIGS. 8-11 or text related to those Figures.

Embodiments use such a computed velocity from a non-linear position correction table as an input into any of the tables, functions or curves shown in FIGS. 8-11 and discussed.

Notes on Claims

Notes below refer to claims numbered as original filed. Claim numbers as granted may not have the same numbers. Text below is non-limiting. It is provide to aid in understanding exemplary scenarios or embodiments. Notes below may be used to construe claims limiting claim scope only when necessary for a claim to be valid under 35 U.S.C. § 112.

Claim 1—describes a method that uses one or two non-linear tables, or a single two-dimensional table with inputs of (a) desired acceleration (or torque); and (b) real-time motor phase angle. The table output(s) are adapted to drive a motor, directly or indirectly. The motor and the method are part of a real-time feedback control system. A controller in this loop provides a new desired acceleration for each iteration. Construction of table includes functions, one or two tables, accessed in series or parallel, and where one table may be part of a motor drive output circuit or module.

Claim 2—adds an input to the table(s) that is the speed of the motor: a rotational speed or linear speed. A single table may be a three-dimensional table, or a combination of tables accessed serially or in parallel.

Claim 3—at least one purpose and construction of the table(s) is to linearize drive to the motor such that the motor actually implements the desired acceleration, or an acceleration (or torque) that is linear with the desired acceleration. Acceleration, as either an input or output of the table, may be normalized, such as from −1 to +1 where this range corresponds to the maximum possible negative acceleration (slowing or accelerating backwards) and to the maximum possible positive acceleration.

Claim 4—adds that the motor is a two-coil stepper motor and the table outputs comprise the two phase angles necessary to drive the two phases. Actual outputs may be digital, analog, normalized, pulse-width modulated (PWM), in any combination. Actual electrical drive to the motor windings may be a coil current, applied voltage, a PWM signal, a combination or other electrical drive.

Claim 5—describes first characterizing a motor to generate one or more tables, or a portion of one or more tables claim 6—describes the first characterizing a motor, either in a system or as a standalone motor, using a sequence of moves, as described elsewhere herein in Figures and text.

Claim 7—adds a position correction table that accepts as an input one or move values from one or more position sensors, or uses an internally known value, such as a step number. The position correction table provides as output a more accurate motor shaft position that the uncorrected table input. "Accepts" means the table uses as input; the source of the real-time motor shaft angle indication is not part of claim scope, for this particular embodiment.

Claim 8—the real-time motor shaft angle indication above is a stepper motor step, half-step, or quarter step number. The source of the step number is not part of the claim scope, for this embodiment. less than ideal manufacturing of the motor or less than ideal positioning Claim 9—The table above specifically corrects for eccentricity. This eccentricity may be anywhere in the system, such as less than ideal manufacturing of the motor or less than ideal positioning of a position sensor relative to a motor shaft, or a less than ideal sensor.

Claim 10—the closed loop system comprises a real-time controller that accepts a series of target waypoints, each waypoint comprising both a target position and a target velocity.

Embodiments are specifically claimed for any configuration of combination of the non-linear tables, which should be construed to include or comprise functions.

Embodiments are specifically claimed for any device that implements any method of an embodiment; any system than implements any method of an embodiment; and any method that implements described steps of a device or system embodiment. In particular, embodiments include devices and systems both with and without motors; and devices and systems both with and without a complete closed loop control. Motors may be rotary or linear.

Definitions

Notes on term usage—when discussing position, speed, velocity, torque and acceleration there may be apparent inconsistency of nomenclature. This is due in part because some terms, such position, are inherently used to describe a point in either one, two, or higher dimensions. Position is commonly used as either a scalar or vector. However, the term speed is generally a scalar while velocity is generally a vector. Like position, the term acceleration, in common usage, may also be either a scalar or a vector. In addition, acceleration is commonly used in the context of linear motion while torque is used in the context of rotational motion. Jerk is the derivative of acceleration, as either scalar or vector, and also as either linear or rotational motion. In addition, discussion, claims, embodiments or drawings that may apparently be referring to only a single axis or set of scalars, such may be extended to refer to multiple axes as parallel independent embodiments, or as synchronized motion between multiple axes. In addition, a wider control loop or predetermined profiles, may be operating on multiple axes, while multiple individual motor controllers are used for the individual axes, all within a single, larger, control loop. In addition, while "rotational position" or "rotational speed" might be used, generally the simpler terms "position" and "speed" are used. Thus, it is important that undue or restrictive interpretation of these terms not be used for construction of claims, embodiments, drawings or descriptions. Generally, the widest reasonable interpretation should be used, unless the context is clear or limitations are otherwise stated. This applies both to scalar v. vector, to linear v. rotational, and to signed v. unsigned.

"Acceleration"—velocity per unit time. See also "velocity" definition and note on term usage.

"Armature current", "armature voltage," "motor current," and "motor voltage"—are measured or measurable electrical signals at one or more motor coils. They may be a result of motor, machine and driver configuration and action, or they may be the output or intended output of a motor control, driver or modulator circuit that is attempting to drive the motor. They may be measured at the motor contacts, the motor coils, are outputs of a motor control, driver or modulator circuit. It is important to realize that such signals are not torque, acceleration or velocity. This paragraph is critical for proper construction of terms used in this patent application and in other teachings, examples, discussion, or publications.

"Combination"—When the term "combination" is used to apply to a list of two or more elements, it means any one or more elements from the list. For example, a list of three elements has seven possible combinations.

"Controlled axis"—refers to an axis that is controllable to desired position, either a linear position or a rotary position, including a controlled velocity between positions, and excludes a continuous rotational axis, even if the rotational speed is variable, for example, a drill press or lathe rotational axis. The controllable desired position resolution should be comparable to the accuracy of desired feature size on a work piece on the machine.

"Endpoint condition"—any condition that causes an iteration to stop, including but not limited to an error condition, an over-range condition, or reaching a target or goal within predetermined limits.

"Jerk"—acceleration per unit time. See also "acceleration and "velocity" definitions and note on term usage.

"Mechanical System"—may be a machine, such as a subtractive machine tool, or an additive machine tool, such as a 3D printer. However, it may be a completely different mechanical system, such a vehicle or a portion of a vehicle. For example, a self-driving, or human controlled with a computation motion engine, such as a vehicle, drone, spacecraft, motorcycle or skier would also be an example of such a mechanical system. With respect to construing claims, "mechanical system" must be construed widely to include systems that behave as analogs to traditional mechanical systems, including all such systems that may be described with an equivalent position, first and second derivatives of that position, and a force equivalent that changes the first derivative.

"Position"—for core methods and devices, a single-axis scalar value. As inputs to these methods and devices, and sometimes feedback from a motion control system, position and its derivatives may be a vector for multiple axes. May be signed or unsigned. See also note on term usage.

"Tool range area"—the area on or over a part surface that is available for machining, either additive or subtractive. For part surfaces that are not horizontal, or on which the machining volume is below the part surface, the meaning of the term, "over" is adjusted accordingly.

"Velocity"—for the iterative jerk method, and for a motor controller, velocity is a scalar per axis that is position per unit time. An alternative word is rate. In the context of core methods and devices, velocity does not include a heading vector because it applies to a single axis. Velocity is typically signed, but may not be. The sign, or direction, may be implied. See also note on term usage.

Ideal, Ideally, Optimum and Preferred—Use of the words, "ideal," "ideally," "optimum," "should" and "preferred," when used in the context of describing this invention, refer specifically a best mode for one or more embodiments for one or more applications of this invention. Such best modes are non-limiting, and may not be the best mode for all embodiments, applications, or implementation technologies, as one trained in the art will appreciate.

May, Could, Option, Mode, Alternative and Feature—Use of the words, "may," "could," "option," "optional," "mode," "alternative," and "feature," when used in the context of describing this invention, refer specifically to various embodiments of this invention. Examples, explanations and figures using the words, "shown" or "code" refer to non-limiting embodiments. All figures are non-limiting embodiments. All descriptions herein are non-limiting, as one trained in the art will appreciate.

Claims of this invention explicitly include all combinations and sub-combinations of all features, elements, examples, claims, embodiments, tables, values, ranges, and drawings in the specification, drawings, claims and abstract. Claims of this invention explicitly include devices and systems to implement any combination of all methods described in the claims, specification and drawings. Claims of this invention explicitly include methods using devices and systems described in the claims, specification and drawings, in any combination.

We claim:

1. A method for iterative motion control comprising the steps:
   (i) accepting an input desired acceleration;
   (ii) looking up in a first, non-linear table, one or more first table outputs responsive to the input desired acceleration;
   (iii) outputting one or more motor drive outputs to a motor, wherein the one or more motor drive outputs are responsive to the one or more first table outputs;
      wherein the one or more motor drive outputs are adapted to control the motor;
      wherein system state data responsive to the motor is fed back to an iterative real-time controller; and
      wherein the iterative real-time controller outputs an updated desired acceleration;
   (iv) iterating steps (i) through (iii) wherein the updated desired acceleration from step (iii) is the desired acceleration in step (i) for each next iteration;
   wherein the first, non-linear table is additionally responsive to a real-time motor phase angle of the motor.

2. The method of claim 1 comprising the additional step:
   (v) accepting a real-time speed of the motor; and
   wherein the first, non-linear table is additionally responsive to the real time speed of the motor.

3. The method of claim 1 wherein:
   the first, non-linear table maps the input desired acceleration to the one or more first table outputs such that the motor generates a torque linearly proportional to the input desired acceleration.

4. The method of claim 1 wherein:
   the motor is a two-coil stepper motor and the one or more first table outputs comprise two phase angles for the two-coil stepper motor.

5. The method of claim 1 comprising the additional step:
   (vi) characterizing the motor so as to generate entries in the first, non-linear table;
   wherein step (vi) is performed prior to step (i).

6. The method of claim 5 wherein:
   the characterizing the motor step comprises a sequence of motor movements, wherein each motor movement in the sequence comprises a fixed phase offset angle for that movement; wherein acceleration of the motor during each motor movement in the sequence is recorded; and wherein each motor movement in the sequence comprises a different fixed phase offset angle.

7. The method of claim 1 comprising the additional step:
   (vii) accepting a real-time motor shaft angle indication;
   (viii) looking up in a second, angular position correction table, a second table output: a corrected shaft angle, responsive to the real-time motor shaft angle indication;
   (ix) computing a motor shaft angular velocity responsive to the corrected shaft angle.

8. The method of claim 7 wherein:
the motor is a stepper motor;
the real-time motor shaft angle indication is a step number of the stepper motor.

9. The method of claim 7 wherein:
the second, angular position correction table correct for an eccentricity between the real-time motor shaft angle indication and actual motor shaft angle.

10. The method of claim 1 wherein:
the iterative real-time controller is adapted to accept a sequence of goal waypoints wherein each waypoint in the sequence comprises a goal position and a goal velocity.

11. A device implementing the method of claim 1.

12. A system implementing the method of claim 1; further comprising the motor and the iterative real-time controller.

* * * * *